United States Patent [19]

Nakajima et al.

[11] Patent Number: 4,811,359

[45] Date of Patent: Mar. 7, 1989

[54] PROTECTION CHANNEL MONITORING SYSTEM USING A CHECK SIGNAL COMPRISING TWO DIFFERENT N-BIT CODE PATTERNS SEQUENTIALLY ARRANGED AT RANDOM

[75] Inventors: Masahiro Nakajima; Satoshi Kashiwaba, both of Tokyo, Japan

[73] Assignee: NEC Corporation, Tokyo, Japan

[21] Appl. No.: 43,653

[22] Filed: Apr. 28, 1987

[30] Foreign Application Priority Data

Apr. 28, 1986 [JP] Japan .................... 61-99254

[51] Int. Cl.⁴ .............................................. H04B 3/46
[52] U.S. Cl. ...................................... 375/10; 375/40; 375/102
[58] Field of Search ............ 375/1, 10, 115, 38, 375/40, 102; 370/16, 84; 455/8; 340/825.01

[56] References Cited

U.S. PATENT DOCUMENTS

| | | | |
|---|---|---|---|
| 4,395,772 | 7/1983 | Trested, Jr. | 375/40 |
| 4,417,348 | 11/1983 | Abbruscato | 375/40 |
| 4,471,491 | 9/1984 | Abe et al. | 375/3 |
| 4,577,312 | 3/1986 | Nash | 370/84 |
| 4,598,399 | 7/1986 | Bath | 370/16 |
| 4,656,645 | 4/1987 | Kaneko | 340/825.01 |
| 4,680,776 | 7/1987 | Ikeuchi et al. | 375/40 |

Primary Examiner—Robert L. Griffin
Assistant Examiner—Stephen Chin
Attorney, Agent, or Firm—Sughrue, Mion, Zinn, Macpeak & Seas

[57] ABSTRACT

A protection channel monitoring system for monitoring a protection channel in a digital communication network comprises a transmitter (31) transmitting a check signal converted and split into a plurality of AMI code signals through the protection channel. The check signal is formed from a pseudo random signal provided by a pseudo random signal generator (15) driven by a pulse signal having a 1/N (N being an integer larger than 1) frequency of a clock pulse signal. The check signal comprises two predetermined N-bit code patterns each comprising logical "0" and "1" level bits. A receiver (32) receives the split AMI code signals through the protection channel and decode the AMI code signals to the NRZ code signals by sampling technique using a sampling signal being derived from one of the received AMI code signals and having the 1/N frequency of the clock pulse signal. Condition of the protection channel is decided by comparison of the decoded NRZ code signals.

8 Claims, 5 Drawing Sheets

| BIT PATTERNS / N | FIRST N-BIT PATTERN | SECOND N-BIT PATTERN |
|---|---|---|
| 2 | 1 0 | 1 0 |
| 3 | 1 0 0 | 1 0 1 |
| 4 | 1 0 0 1 | 1 0 1 1 |
| 5 | 1 0 0 1 0 | 1 0 1 1 0 |
| 6 | 1 0 0 1 0 0 | 1 0 1 1 0 1 |
| 7 | 1 0 0 1 0 0 1 | 1 0 1 1 0 1 1 |
| ⋮ | ⋮ | ⋮ |
| N | N BITS<br>1 0 0 1 0 0 -------- | N BITS<br>1 0 1 1 0 1 -------- |

FIG 4

PROTECTION CHANNEL MONITORING SYSTEM USING A CHECK SIGNAL COMPRISING TWO DIFFERENT N-BIT CODE PATTERNS SEQUENTIALLY ARRANGED AT RANDOM

BACKGROUND OF THE INVENTION (1) Field of the Invention

The present invention relates to a digital communication network and, in particular, to a monitoring system for monitoring a protection channel provided for protecting transmission channels from fault in the digital communication system.

(2) Description of the Prior Art

A digital communication network usually has one or more protection or stand-by channels in addition to regular or normally active channels. When any failure such as bit error, out-of-frame synchronization or others occurs in any one of the regular channels, the faulty regular channel is switched over the protection channel so that the data transmission over to the channel is continued without failure. References are made to, for example, U.S. Pat. No. 4,442,518 by Morimoto assigned to Nippon Electric Company, Ltd. and U.S. Pat. No. 4,477,895 by Casper et al assigned to Harris Corporation.

In order to monitor condition of the protection channel, the digital communication network has a protection channel monitoring system.

In a known protection channel monitoring system disclosed in Japanese patent application laid open with No. 60-214135, a check signal is encoded to an AMI (Alternate-Mark-Inversion) code signal. The AMI code signal is split delivered to a plurality of transmission lines or transmission signals which are transmitted to a receiver through a protection channel to be monitored. In an actual manner, of a special example, the AMI code is delivered to a plurality of modulators wherein a carrier wave is modulated by the split AMI code signals according to a plurality of different modulating methods to obtain a plurality of different modulated waves. The modulated waves are transmitted to the receiver through the protection channel.

The receiver receives the respective modulated waves and detects the split AMI code signals from the modulated waves. The split AMI code signals are decoded to NRZ (Non-Return-to-Zero) code signals by the sampling technique at AMI code decoding circuits, respectively.

A sampling pulse signal is derived from one of the split AMI code signals as detected and has a pulse frequency equal to the clock pulse signal.

The decoded NRZ signals are compared with one another. When respective split AMI code signals are transmitted through the protection channel without any code error, all of the decoded NRZ signals are equal to one another.

When the protection channel is already used as an active channel or has any fault, the split AMI code signals are subjected to code errors during transmission through the protection channel, and therefore, the decoded NRZ signals are not coincident with one another.

Therefore, the condition of the protection channel is detected from the result of the comparison.

In the known protection channel monitoring system, the check signal is a pseudo random signal synchronized with the clock pulse frequency corresponding to the data transfer rate. Therefore, in order to decode each received AMI code signal to the NRZ code signal, the sampling must be carried out at each bit of the check signal. Therefore, the timing margin of each sampling point is so small that an error is apt to occur in the decoding operation.

SUMMARY OF THE INVENTION

It is an object of the present invention to provide a protection channel monitoring system wherein the sampling of the AMI code signals as transmitted through a protection channel can be carried out with an increased timing margin to thereby reduce possibility of erroneous decoding operation of the received AMI code signals.

A protection channel monitoring system for use in a digital communication network comprises, as described above, a transmitter and a receiver as a plurality of transmission signals coupled with each other by a protection channel. The transmitter comprises check signal generating means for generating a unipolar check signal and unipolar-to-bipolar converting means for converting the check signal into a bipolar signal to produce an AMI (Alternate-Mark-Inversion) code signal. The AMI code signal is transmitted to the receiver as a plurality of transmission signals through the protection channel. The receiver comprises a plurality of decoding means for decoding the split AMI code signals as received into NRZ (Non-Return-to-Zero) code signals, to produce decoded NRZ signals, respectively, comparing means for comparing the decoded NRZ signals with one another to produce a coincidence/non-coincidence signal, and deciding means responsive to the coincidence/non-coincidence signal for deciding condition of the protection channel.

According to the present invention, the check signal generating means comprises clock pulse generating means for generating a clock pulse signal having a clock frequency (f). A period (1/f) of the clock pulse signal defines one-bit length. The clock pulse signal is a frequency divided at frequency dividing means having a dividing ratio of 1/N (N being an integer of 2 or more) and a frequency-divided pulse signal is obtained therefrom. Pseudo random signal generating means is responsive to the frequency-divided pulse signal and generates a pseudo random signal having a sufficiently long repetition period. The pseudo random signal comprises N-bit length logical "1" level portions and N-bit length logical "0" level portions sequentially arranged at random. N-bit pattern converting means is responsive to the pseudo random signal and converts each of the N-bit length logical "0" level portions and each of the N-bit length logical "1" level portions into a first predetermined N-bit code pattern comprising logical "0" level and "1" level bits and a second predetermined N-bit code pattern comprising logical "0" level and "1" level bits, respectively. The N-bit pattern converting means produces a pattern converted signal as the unipolar check signal.

According to one aspect, when N is an integer of 3 or more, the first predetermined N-bit code pattern is formed so that the logical "0" level bits are disposed to continue by two bits with the logical "1" level bits being disposed at intervals, and the second predetermined N-bit code pattern is formed so that the logical "1" level bits are disposed to continue by two bits with the logical "0" level bits being at intervals.

The receiver comprises sampling pulse deriving means for deriving from a rectified signal of one of the received AMI code signals a timing signal synchronous with the frequency-divided pulse signal. The timing signal is provided as a sampling pulse signal in decoding operation of each of the decoding means. Each of the decoding means comprises rectifying means for rectifying a corresponding one of the received AMI code signals to produce an RZ (Return-to-Zero) signal. Dividing means divides the RZ signal by 2 and produces ½ divided signal of an NRZ form. Delaying means is responsive to the sampling pulse signal and delays the ½ divided signal by N bits to produce a delayed signal. Phase-comparing means is responsive to the sampling pulse signal and phase-compares the delayed signal with said ½ divided signal to produce an output as the decoded NRZ signal.

BRIEF DESCRIPTION OF THE DRAWINGS

FIG. 4 is a view illustrating examples of two N-bit code patterns used in the system of FIG. 3.

DESCRIPTION OF PREFERRED EMBODIMENT

Prior to description of an embodiment of the present invention, the above-described known protection channel monitoring system is described with reference to FIGS. 1 and 2, for the purpose of the better understanding of the present invention.

A digital communication network has a plurality of normally active or regular channels and one or more protection channels interconnecting a pair of terminal stations at opposite ends of the network. Referring to FIG. 1, the known protection channel monitoring system comprises a transmitter 11 disposed in one of the terminal stations for transmitting a check signal as a plurality of (m) split AMI code signals, to a protection channel to be monitored. A receiver 12 is disposed in the other one of the terminal stations and is coupled with the transmitter 11 through a transmission line 13 of the protection channel.

Figure 2:
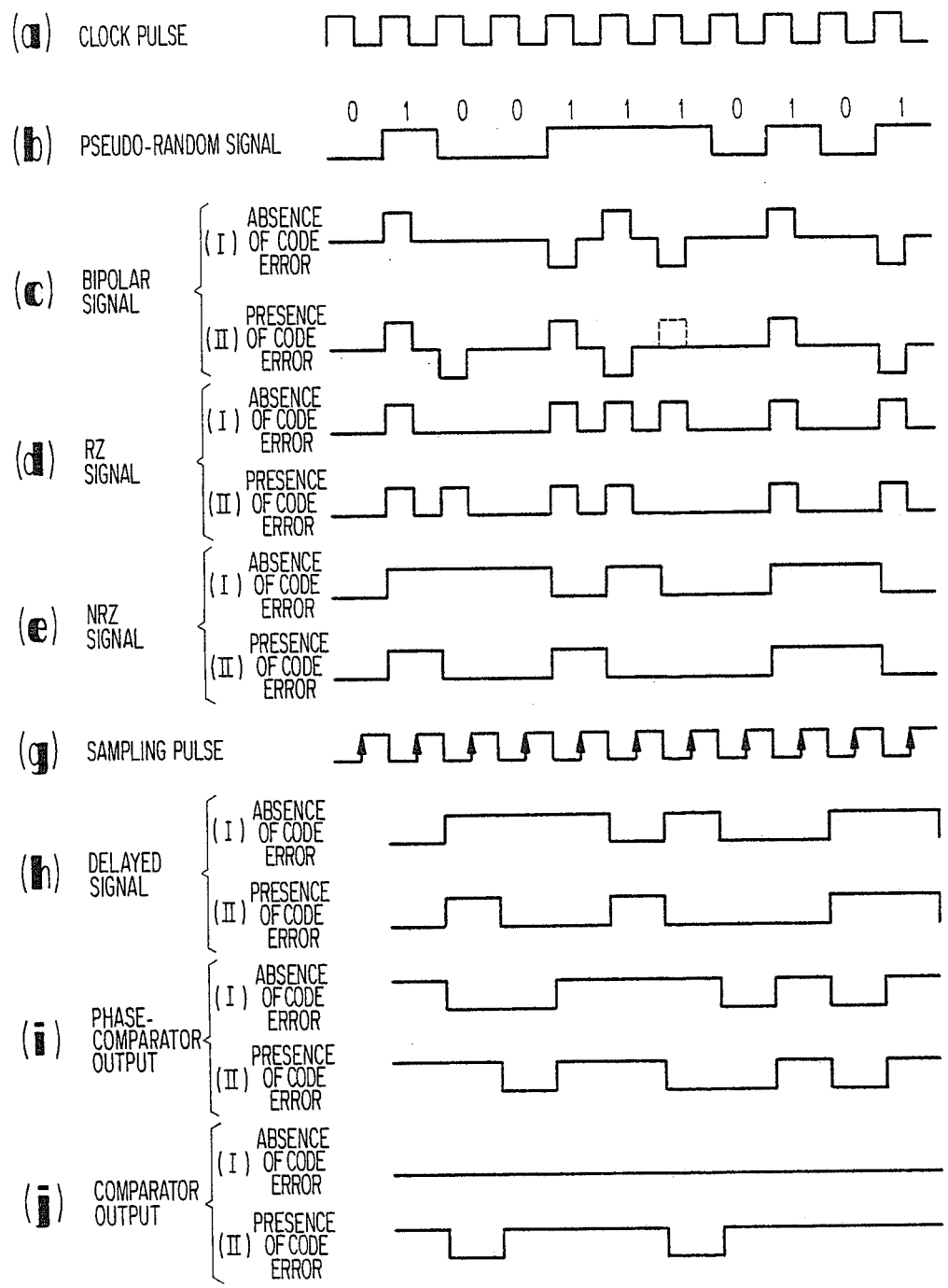
FIG. 2 is a view illustrating waveforms at various portions of the known system of FIG. 1.

The transmitter 11 comprises a clock pulse generator 14 for generating a clock pulse signal a (see (a) in FIG. 2) having a pulse frequency f(Hz) corresponding to a data transfer rate, and a pseudo random signal generator 15 responsive to the clock pulse signal a for generating a pseudo random signal b (see (b) in FIG. 2). The pseudo random signal b is a unipolar signal and has a sufficiently long repetition period L (L>>1/f).

The pseudo random signal b is used as a check signal for monitoring the protection channel and is transmitted as different modulated waves to the protection channel. The pseudo random signal b is converted to an AMI code signal or a bipolar signal c (see (I) of (c) in FIG. 2) at a unipolar/bipolar converter 16. The bipolar signal c is split into a plurality of AMI code signals $c_1$-$c_m$, or delivered as a plurality of transmission signals $c_1$-$c_m$ to a plurality of transmission lines 13 of the protection channel as shown in the figure, which are transmitted to the receiver. In a special example, the AMI code signal is split and delivered to a plurality of modulators from which the AMI code signals are transmitted after modulating a carrier according to different modulating method, as different modulated wave signals, to the transmission line 13 of the protection channel.

The modulated wave signals are received at the receiver 12 and demodulated to obtain respective AMI code signals. Each AMI code signal has the same waveform as the bipolar signal c in the transmitter 11 as shown at (I) of (c) in FIG. 2, if no code error is caused during transfer of the modulated signals along the transmitter line (absence of code error). However, if any code error occurs (presence of code error), the received and demodulated bipolar or AMI code signal is different from the bipolar or AMI code signal c to be transmitted. An example of the received and demodulated bipolar or AMI code signal with a code error is shown at (II) of (c) in FIG. 2. Portions shown by dotted lines are changed by the code error.

The receiver 12 comprises a plurality of (m) rectifiers 17 for carrying out absolute conversion of the demodulated bipolar or AMI code signals $c_1$-$c_m$ into RZ signals $d_1$-$d_m$ (see (d) in FIG. 2), respectively.

The RZ signals $d_1$-$d_m$ are applied to a plurality of (m) ½ frequency dividers 18 and are converted into divided signals of the NRZ form $e_1$-$e_m$ (see (e) in FIG. 2), respectively.

A sampling pulse deriving circuit 19 derives from one ($d_1$ in this embodiment) of the RZ signals a sampling pulse signal g (see (g) in FIG. 2), which has a frequency (f) equivalent with the data transfer rate.

The divided NRZ signals $e_1$-$e_m$ are sampled by the sampling pulse signals (g) and delayed by one bit at delay circuits 20, to produce delayed signals $h_1$-$h_m$ (see (h) in FIG. 2), respectively. The delayed signals $h_1$-$h_m$ are phase-compared with the divided NRZ signals $e_1$-$e_m$ at phase comparators 21, respectively, under control of the sampling pulse signal g. The phase comparators 21 produce decoded signals $i_1$-$i_m$ at (see (i) in FIG. 2).

The rectifier 17, divider 18, delay circuit 20, and phase comparator 21, constitute together with the sampling pulse deriving circuit 19 an AMI code decoding circuit for decoding AMI code signal into an NRZ code signal as well known in the prior art. The AMI code decoding circuits for m demodulated AMI code signals are represented by a reference numeral 24 in FIG. 1.

A comparator 22 compares the decoded signals $i_1$-$i_m$ with one another and produces an output signal indicating the result of the comparison.

When respective modulated wave signals are transmitted without any code error, the received and demodulated bipolar or AMI code signals have the same waveform as shown at (I) of (c) in FIG. 2. Therefore, RZ signals $d_1$-$d_m$, divided NRZ signals $e_1$-$e_m$, delayed signals $h_1$-$h_m$, and decoded signals $i_1$-$i_m$ have waveforms as shown at (I) of (d), (e), (h), and (i) in FIG. 2, respectively. Accordingly, the comparator 22 provides a coincidence signal ((I) of (j) in FIG. 2) indicating coincidence of all of the decoded NRZ signals.

A channel condition decision circuit 23 receives the coincidence signal and decides that the protection channel is in an available condition for substitution for any faulty regular channel On the other hand, when there is any code error in a specific one of the split AMI code signals during transmission through the protection channel while the other is subjected to no code error, the specific AMI code signal has, for example, a waveform as shown at (II) of (c) in FIG. 2 which is different from that of each of the other demodulated bipolar signals Therefore, the RZ signal, the divided NRZ signal, the delayed signal, and the decoded signal for the specific bipolar signal have waveforms as shown at (II) of (d), (e), (h), and (i) in FIG. 2, respectively. Thus, the decoded NRZ signal of the specific AMI code signal as received is different from those of the other AMI code signals. Accordingly, the comparator 22 provides the output signals illustrated at (II) of (j) in FIG. 2, which indicates non-coincidence between decoded NRZ code signals. Therefore, the decision circuit 23 decides that the protection channel is now used as an active channel or faulty.

From comparison of the sampling pulse signal g ((g) in FIG. 2) and the divided NRZ signal e ((e) in FIG. 2), it will be noted that the timing margin at each sampling point is only one bit of the transmitted check signal.

Figure 3:
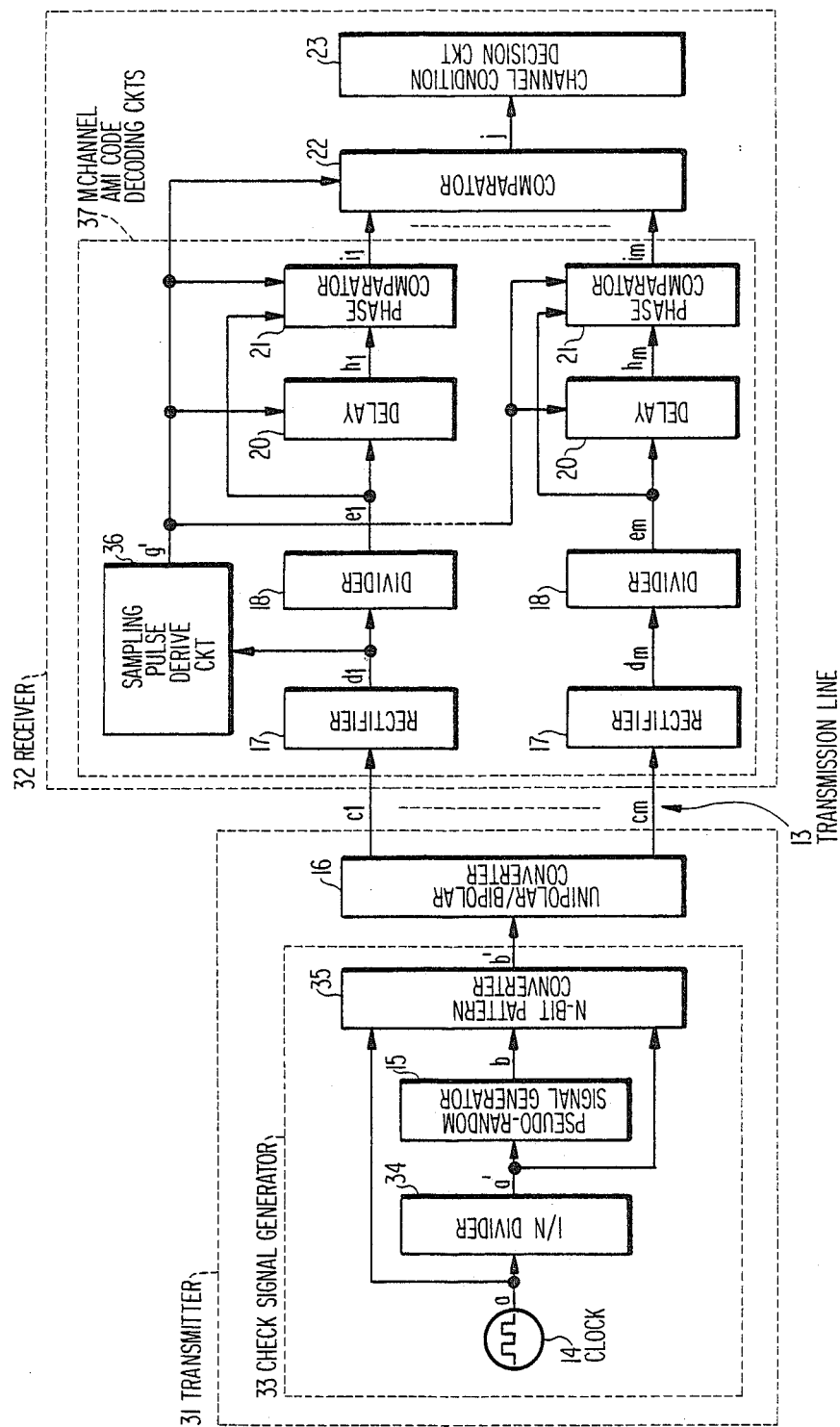
FIG. 3 is a block diagram of a protection channel monitoring system according to an embodiment of the present invention.

Referring to FIG. 3, a protection channel monitoring system according to an embodiment of the present invention comprises a transmitter 31 and a receiver 32 interconnected by transmission line 13 of a protection channel.

Figure 1:
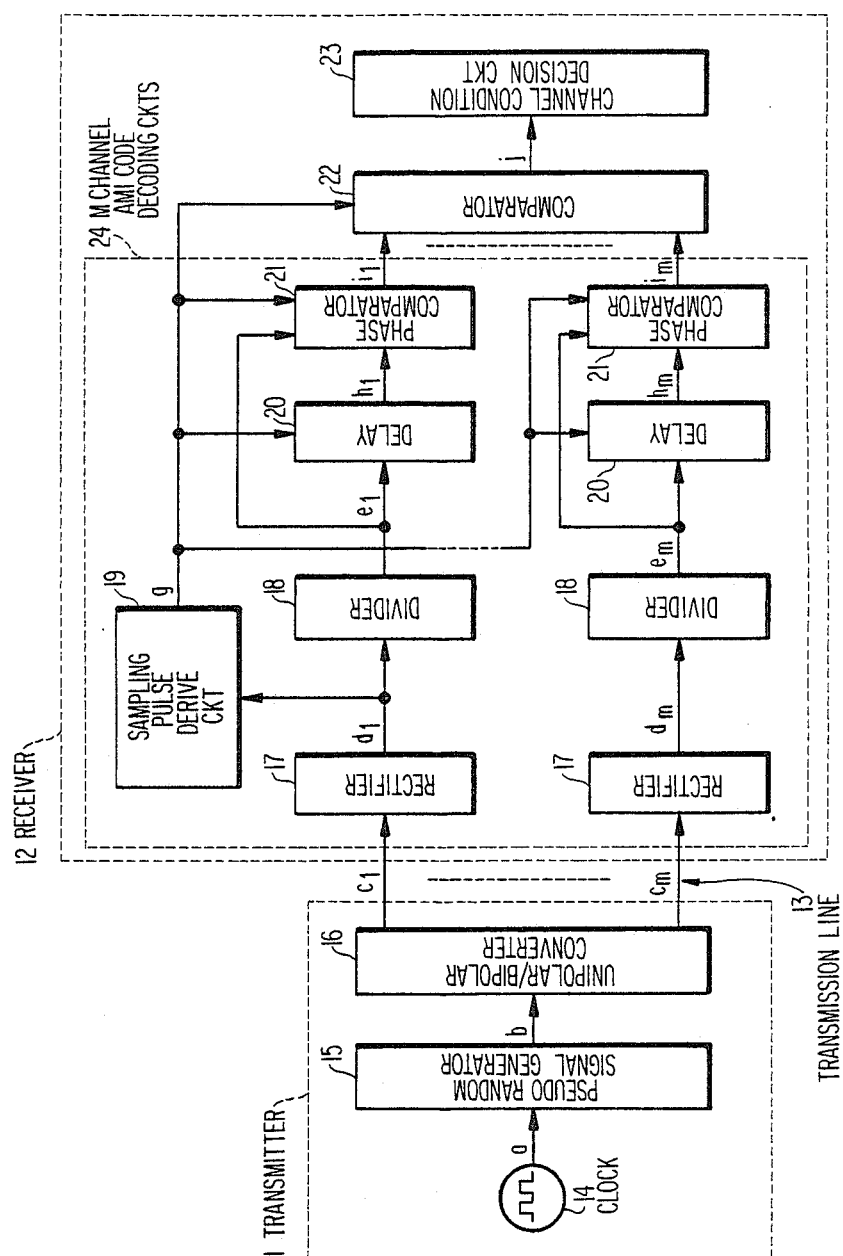
FIG. 1 is a block diagram of a known protection channel monitoring system.

The system has circuit portions similar to those of the known system of FIG. 1. The similar circuit portions are designated by the same reference characters as in FIG. 1.

The transmitter 31 comprises a check signal generator 33 and a unipolar/bipolar converter 16.

The check signal generator 33 is for generating a checking signal for monitoring the protection channel. The check signal generator 33 comprises a 1/N (N being an integer larger than 1) divider 34 for dividing the clock pulse signals a of the frequency (f) from the clock pulse generator 14 into a pulse signal a' of a frequency of (f/N). The frequency-divided pulse signal a' is applied to the pseudo random signal generator 15. Therefore, pseudo random signal generator 15 is driven by the pulse signal a' of the frequency (f/N) and produces a pseudo random signal b. Accordingly, the pseudo random signal b comprises logical "1" level portions and "0" level portions sequentially arranged at random. Each portion of logical "1" and "0" level portions is continued over N bits (one bit being defined by a period of 1/f of the clock pulse signal a ). Therefore, the pseudo random signal b has a repetition period of M longer than L (M>L) of the pseudo random signal b in FIG. 1.

The clock pulse signal a, the frequency-divided pulse signal a', and the pseudo random signal b are applied to an N-bit pattern converter 35.

N-bit pattern convertor 35 converts each of the N-bit length logical "0" level portions and each of the N-bit length logical "1" level portions into a first predetermined N-bit code pattern comprising logical "0" level and "1" level bits and a second predetermined N-bit code pattern comprising logical "0" level and "1" level bits, respectively, under control of the clock pulse signal a and the frequency divided pulse signal a'.

FIG. 4 shows examples of the first predetermined N-bit code pattern and the second N-bit code pattern for various values of N. As shown in FIG. 4, when N is an integer of 3 or more, the first predetermined N-bit code pattern is formed so that the logical "0" level bits are disposed to continue by two bits with the logical "1" level bits being disposed at intervals. The second predetermined N-bit code pattern is formed so that the logical "1" level bits are disposed to continue by two bits with the logical "0" level bits being at intervals.

N-bit pattern convertor 35 produces a pattern converted signal as the unipolar check signal.

The unipolar check signal is applied to unipolar/bipolar convertor 16 and is converted into the AMI code signal and delivered to a plurality of transmission lines of the protection channel as a plurality of transmission signals. The AMI code signal is split into a plurality of AMI code signals $c_1$-$c_m$ which are transmitted to the receiver through the protection channel in the similar manner as in the known system of FIG. 1.

The receiver 32 comprises m AMI code decoding circuits 37 similar to the m channel AMI code decoding circuits 24 in FIG. 1. Similar circuit portions are represented by the same reference numerals as in FIG. 1.

The sampling pulse deriving circuit 36 is different from the sampling pulse deriving circuit 19 in FIG. 1 and derives from the RZ signal $d_1$ a timing pulse signal as a sampling pulse signal g' having a frequency of f/N. The sampling pulse signal g' is applied to each delay circuit 20 and each phase comparator 21. Therefore, each delay circuit 20 and each phase comparator 21 are driven at N-bit intervals.

Next, description will be made as to operation of the system of FIG. 3 for N=3 with respect to FIG. 5.

Figure 5:
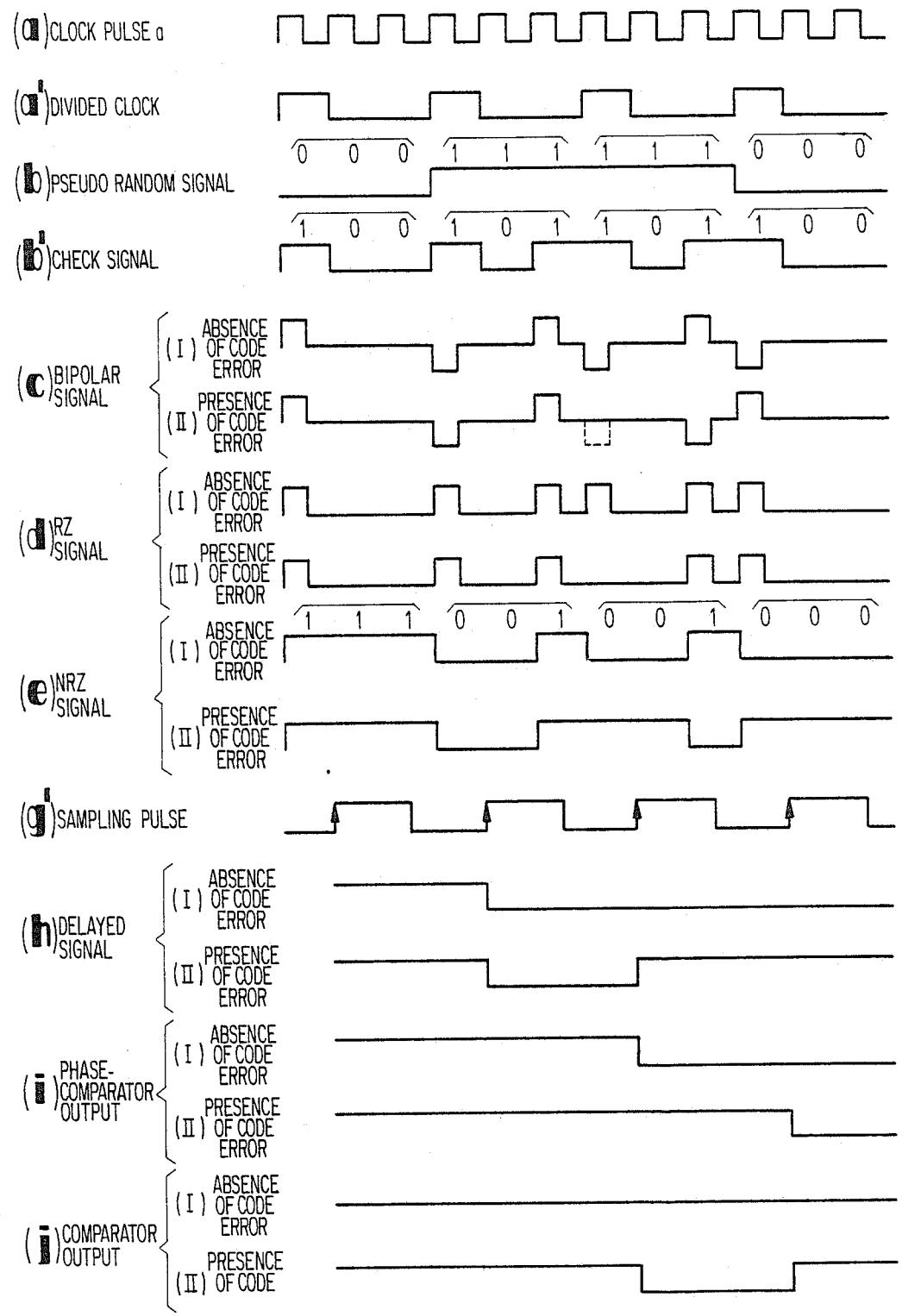
FIG. 5 is a view illustrating waveforms at various portions of the system of FIG. 3.

At the transmitter 31, the clock pulse generator 14 sends out the clock pulse signal a ((a) in FIG. 5) to the 1/N (N=3) frequency divider 34 and the N-bit pattern converter 35. The ⅓ frequency divider 34 converts the clock pulse signal a into ⅓ frequency-divided pulse signal a' ((a') in FIG. 5), which is supplied to the pseudo random signal generator 15 and the N-bit pattern converter 35.

The pseudo random signal generator 15 generates, in response to the ⅓ frequency divided pulse signal a', the pseudo random signal b ((b) in FIG. 5), which is fed to the N-bit pattern converter 35.

The pseudo random signal comprises mark portions "111" each having the logical "1" level for successive three bits and space portions "000" each having the logical "0" level for successive three bits.

The N-bit pattern converter 35 converts the three bit successive mark portion "111" in the pseudo random signal b into the second predetermined three bit code pattern "101" and also converts the three bit successive space portion "000" into the first three bit code pattern "100", according to the patterns for N=3 in FIG. 4.

The converted signal b' ((b') in FIG. 5) is applied to the unipolar/bipolar converter 16, as the check signal. The check signal b' is converted into an AMI code signal or a bipolar signal c which is split into a plurality of AMI code signals $c_1$-$c_m$ and transmitted to the receiver 32 through the protection channel.

Then, at the receiver 32, the received AMI code signals $c_1$-$c_m$ are absolutely converted at the m rectifiers 17 into RZ signals $d_1$-$d_m$ (see (d) in FIG. 5), respectively, which are applied to ½ dividers 18, with one (for example, $d_1$) of them being fed to the sampling pulse deriving circuit 36.

The sampling pulse deriving circuit 36 derives from the input RZ signal $d_1$ a sampling pulse signal g' (see (g') in FIG. 5) having a frequency of ⅓ of the clock pulse frequency (f), which is applied to the delay circuits 20, phase comparators 21, and the comparator 22.

The dividers 18 convert the input RZ signals $d_1$-$d_m$ into divided signals of the NRZ form $e_1$-$e_m$ (see (e) in FIG. 5), respectively, which are supplied to delay circuits 20 and phase comparators 21, respectively.

The delay circuits 20 sample the input divided signals $d_1$–$d_m$ by the sampling pulse signal g' every three bits, respectively, and send out to the phase comparators 21 the delayed signals $h_1$–$h_m$ (see (h) in FIG. 5) which are delayed by 3 bits. The phase comparators 21 phase compare the output signals $e_1$–$e_m$ from the dividers 18 with the output signals $h_1$–$h_m$ from the delay circuits 20, respectively, at every three bits, and output phase-compared output signals $i_1$–$i_m$ (see (i) in FIG. 5) as the decoded NRZ code signals, which are applied to the comparator 22.

The decoded NRZ code signals $i_1$–$i_m$ are signals having a ⅓ rate of the data transfer rate. The comparator 22 receives the decoded NRZ code signals $i_1$–$i_m$ and detects coincidence or non-coincidence between respective decoded NRZ code signals to produce a coincidence/non-coincidence signal j (see (j) in FIG. 5) which is fed to the channel condition decision circuit 23 in a similar manner as in the prior art.

In detail, for the three bit successive mark portion of the check signal b being converted into the second predetermined three bit code pattern "101" at the N-bit pattern converter 35, each divided NRZ signal e comprises a three bit code pattern "001". While, for the three bit successive space portion of the check signal b being converted into first three bit code pattern "100", each divided NRZ signal e comprises a three bit pattern "111" or "000", as shown at (b), (b'), and (I) of (e) in FIG. 5. Each pattern has a constant portion maintained over two successive bits. By sampling the successive two bits constant portion, the timing margin for the sampling can be set at two or three bits.

With respect to comparison of coincidence or non-coincidnce between respective decoded NRZ signals $i_1$–$i_m$ at the comparator 22, the decoded NRZ code signals $i_1$–$i_m$ are equal to one another (see (I) of (i) in FIG. 5) when no error is caused in each of the input AMI code signals $c_1$–$c_m$ transmitted through the protection channel. Therefore, the output signal j from the comparator 22 indicates the coincidence or no code error (see (I) of (j) in FIG. 5). The coincidence signal is sent out to the channel condition decision circuit 23.

However, when any one of the input AMI code signals has a code error, the decoded NRZ signal (see (II) of (i) in FIG. 5) is different from the other decoded NRZ signal (see (I) of (i) in FIG. 5), so that the comparator 22 sends the output signal indicating the non-coincidence or presence of the code error (see (II) of (j) in FIG. 5) to the channel condition decision circuit 23. Thereby, it is possible to monitor the condition of the protection channel.

For various values of N, the operation will be understood by those skilled in the art with reference to the above-described operation for the case of N=3.

What is claimed is:

1. In a protection channel monitoring system comprising a transmitter (11, 31) and a receiver (12, 32) coupled with each other by a protection channel ($c_1$–$c_m$, 13) for use in a digital communication network, said transmitter (11, 31) comprising check signal generating means (15, 33) for generating a unipolar check signal and a unipolar-to-bipolar converting means (16) for converting said check signal into a bipolar signal to produce an AMI (Alternate-Mark-Inversion) code signal, said AMI code signal being transmitted to said receiver as a plurality of transmission signals through said protection channel, said receiver (12, 32) comprising a plurality of decoding means (24, 37) responsive to said AMI code signals as received through the protection channel for decoding said AMI code signals into NRZ (Non-Return-to-Zero) code signals, to produce decoded NRZ signals ($i_1$–$i_m$), respectively, comparing means (22) for comparing said decoded NRZ signals with one another to produce a coincidence/non-coincidence signal (j), and deciding means (23) responsive to said coincidence/non-coincidence signal for deciding condition of said protection channel, the improvement wherein said check signal generating means (33) comprises:

clock pulse generating means (14) for generating a clock pulse signal (a) having a clock frequency (f), a period (1/f) of said clock pulse signal defining one-bit length;

frequency dividing means (34) having a dividing ratio of 1/N (N being an integer of 2 or more) for frequency-dividing said clock pulse signal to produce a frequency-divided pulse signal (a');

pseudo random signal generating means (15) responsive to said frequency-divided pulse signal (a') for generating a pseudo random signal (b) having a sufficiently long repetition period, said pseudo random signal comprising N-bit length logical "1" level portions and N-bit length logical "0" level portions sequentially arranged at random; and N-bit pattern converting means (35) responsive to said pseudo random signal (b) for converting each of said N-bit length logical "0" level portions and each of said N-bit length logical "1" level portions into a first predetermined N-bit code pattern comprising logical "0" level and "1" level bits and a second predetermined N-bit code pattern comprising logical "0" level and "1" level bits, respectively, said N-bit pattern converting means (35) producing a pattern converted signal as said unipolar check signal.

2. A protection channel monitoring system as claimed in claim 1, wherein N is an integer of 3 or more, said first predetermined N-bit code pattern being formed so that the logical "0" level bits are disposed to continue by two bits while the logical "1" level bits being disposed at intervals, said second predetermined N-bit code pattern being formed so that the logical "1" level bits are disposed to continue by two bits while the logical "0" level bits being at intervals.

3. A protection channel monitoring system as claimed in claim 1, wherein each of said decoding means (37) comprises rectifying means (17) for rectifying a corresponding one of said received AMI code signals ($c_1$–$c_m$) to produce an RZ (Return-to-Zero) signal, dividing means (18) for dividing said RZ signal by 2 to produce ½ divided signal ($e_1$–$e_m$) of an NRZ form, delaying means (20) responsive to a sampling pulse signal (g') for delaying said ½ divided signal by N bits to produce a delayed signal ($h_1$–$h_m$), and phase-comparing means (21) responsive to said sampling pulse signal (g') for phase-comparing said delayed signal ($h_1$–$h_m$) with said ½ divided signal ($e_1$–$e_m$) to produce an output ($i_1$–$i_m$) as said decoded NRZ signal.

4. A protection channel monitoring system as claimed in claim 3, wherein said receiver (32) further comprises sampling pulse deriving means (36) being coupled with said rectifying means of one of said decoding means for deriving, as said sampling pulse signal, a timing signal synchronous with said frequency-divided pulse signal from said RZ signal from said rectifying means.

5. A transmitter for use in a monitoring system for monitoring a protection channel in a digital communication network, said transmitter comprising;
   check signal generating means for generating a unipolar check signal, said check signal generating means comprising;
      clock pulse generating means for generating a clock pulse signal having a clock frequency (f), a period (1/f) of said clock pulse signal defining one-bit length;
      frequency dividing means having a dividing ratio of 1/N (N being an integer of 2 or more) for frequency-dividing said clock pulse signal to produce a frequency-divided pulse signal;
      pseudo random signal generating means responsive to said frequency-divided pulse signal for generating a pseudo random signal having a sufficiently long repetition period, said pseudo random signal comprising N-bit length logical "1" level portions and N-bit length logical "0" level portions sequentially arranged at random; and
      N-bit pattern converting means responsive to said pseudo signal for converting each of said N-bit length logical "0" level portions and each of said N-bit length logical "1" level portions into a first predetermined N-bit code pattern comprising logical "0" level and "1" level bits and a second predetermined N-bit code pattern comprising logical "0" level and "1" level bits, respectively, said N-bit pattern converting means producing a pattern converted signal as said unipolar check signal; and
   unipolar-to-bipolar converting means for converting said check signal into a bipolar signal to produce an AMI (Alternate-Mark-Inversion) code signal, said AMI code signal being transmitted to a receiver as a plurality of transmission signals through said protection channel.

6. A transmitter as claimed in claim 5, wherein N is an integer of 3 or more, said first predetermined N-bit code pattern being formed so that the logical "0" level bits are disposed to continue by two bits while the logical "1" level bits being disposed at intervals, said second predetermined N-bit code pattern being formed so that the logical "1" level bits are disposed to continue by two bits while the logical "0" level bits being at intervals.

7. A receiver for use in a monitoring system for monitoring a protection channel and being adapted to use in combination with said transmitter as claimed in claim 5, said receiver comprising:
   a plurality of decoding means for decoding said received AMI code signals into NRZ (Non-Return-to-Zero) code signals, to produce decoded NRZ signals, respectively, each of said decoding means comprising;
      rectifying means for rectifying a corresponding one of said received AMI code signals to produce an RZ (Return-to Zero) signal;
      dividing means for dividing said RZ signal by 2 to produce ½ divided signal of an NRZ form;
      delaying means responsive to a sampling pulse signal synchronous with said frequency-divided pulse signal for delaying said ½ divided signal by N bits to produce a delayed signal;
      phase-comparing means responsive to said sampling pulse signal for phase-comparing said delayed signal with said ½ divided signal to produce an output as said decoded NRZ signal; and
   comparing means for comparing said decoded NRZ signals with one another to produce a coincidence/non-coincidence signal; and
   deciding means responsive to said coincidence/non-coincidence signal for deciding condition of said protection channel.

8. A receiver as claimed in claim 7, which further comprises sampling pulse deriving means being coupled with said rectifying means of one of said decoding means, said sampling pulse deriving means deriving said sampling pulse signal, a timing signal synchronous with said frequency-divided pulse signal, as said sampling pulse signal, from said RZ signal from said rectifying means.

* * * * *